United States Patent [19]
Hsieh

[11] Patent Number: 6,009,140
[45] Date of Patent: Dec. 28, 1999

[54] STAIR-CASE SUPPRESSION FOR COMPUTED TOMOGRAPH IMAGING

[75] Inventor: Jiang Hsieh, Waukesha, Wis.

[73] Assignee: General Electric Company, Milwaukee, Wis.

[21] Appl. No.: 08/965,957

[22] Filed: Nov. 7, 1997

[51] Int. Cl.[6] .................................................. A61B 6/03
[52] U.S. Cl. ............................................. 378/4; 378/901
[58] Field of Search ......................... 378/4, 901; 382/131

[56] References Cited

U.S. PATENT DOCUMENTS

| 4,991,092 | 2/1991 | Greensite | 382/131 |
| 5,825,936 | 10/1998 | Clarke et al. | 382/261 |

*Primary Examiner*—David P. Porta
*Assistant Examiner*—David Vernon Bruce
*Attorney, Agent, or Firm*—John S. Beulick; Christian G. Cabou; Phyllis Y. Price

[57] ABSTRACT

A correction algorithm for substantially eliminating "stair case" type artifacts in dental scans is described. In one specific embodiment, all high density object boundaries in the reformatted images are identified. To identify high density object boundaries, structures in the reformatted image are separated into two classes, namely, structure containing teeth and structure not containing teeth. Then, within each class, fuzzy logic is used to define the membership grade of each pixel. Particularly, linear interpolation is utilized to determine the boundary, and to reduce the probability that spike noise will be erroneously considered as high density objects, the N by N neighbors of the boundary candidate are searched to ensure that the number of pixels that belong to the high density object exceeds a certain predefined threshold. Such searching can be performed by summing the N by N neighbors of the membership function, $\xi$, and comparing the summation against a pre-defined threshold. Once the boundaries of the neighboring rows are located, the difference between the true boundary of the current row and the average boundary location of the two neighboring rows is determined to generate a boundary error candidate, $\delta_{i,j}$. Since multiple boundaries can be found within each row, all the error candidates for the row are recorded and tested to determine the consistency among the error candidates within each row. Particularly, the average error candidate, $\bar{\delta}_j$ and the average of the quantity $|\delta_{i,j}-\bar{\delta}_{i,j}|$ for all the error candidates for row j is determined to produce $\omega_j$. If $\omega_j$ is less than a pre-defined threshold, the shift in object boundaries for row j is likely caused by motion, and a simple linear shift of the row by an amount $\bar{\delta}_{i,j}$ is performed. Otherwise, each boundary that has significant shift is smoothed along the boundary direction with the neighboring rows.

20 Claims, 2 Drawing Sheets

BOUNDARY CANDIDATE

SEARCH REGION

BOUNDARY CANDIDATE

SEARCH REGION

STAIR-CASE SUPPRESSION FOR COMPUTED TOMOGRAPH IMAGING

FIELD OF THE INVENTION

This invention relates generally to computed tomography (CT) imaging and more particularly, to suppressing stair-case artifacts in multi-planar reformat CT imaging.

BACKGROUND OF THE INVENTION

In at least one known CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts that attenuation measurements from a scan into integers called "CT numbers" or "Hounsfield units", which are used to control the brightness of a corresponding pixel on a cathode ray tube display.

With respect to reformatted dental scans, the reformation is performed across slices along a pre-defined curved line, in a similar manner as multi-planar reformation. A pronounced "stair case" artifact may appear in the reformatted image. This artifact is caused by patient motion and/or by irregular table motion. Increasing the amount of motion suppression in the tomographic reconstruction reduces the motion effect. For example, and for motion suppression, the projection data set is first multiplied by a set of "underscan" weighing factors before the reconstruction process. Since the underscan weighting reduces the contribution at the beginning and end of the projection data set, patient motion related artifacts can be substantially reduced.

The underscan weighting, however, reduces the contribution from the views that are closest to the projections used in the generation of the neighboring slices. As a result, although the motion effect within each tomographic slice is reduced, the discontinuity between slices is increased.

It would be desirable to provide a correction algorithm which is effective in correcting images for stair case type artifacts in dental scans. It also would be desirable to provide such an algorithm which enables reducing the motion effect within each tomographic slice without increasing the discontinuity between slices.

SUMMARY OF THE INVENTION

These and other objects may be attained by a correction algorithm for substantially eliminating "stair case" type artifacts in dental scans. More particularly, and in one specific embodiment, all high density object boundaries in the reformatted images are identified. To identify high density object boundaries, structures in the reformatted image are separated into two classes, namely, structure containing teeth and structure not containing teeth. To perform such classification, and for each row in the reformatted image (and therefore, each slice in the reconstructed image), the maximum intensity is identified. If the maximum intensity exceeds a predefined threshold, the row is classified as the "teeth" class. Otherwise, the row is classified as not containing teeth, i.e., formed with bones only.

Then, within each class, fuzzy logic is used to define the membership grade of each pixel. Particularly, linear interpolation is utilized to determine the boundary, and to reduce the probability that spike noise will be erroneously considered as high density objects, the N by N neighbors of the boundary candidate are searched to ensure that the number of pixels that belong to the high density object exceeds a certain predefined threshold. Such searching can be performed by summing the N by N neighbors of the membership function, $\xi$, and comparing the summation against a pre-defined threshold.

Once the boundaries of the neighboring rows are located, the difference between the true boundary of the current row and the average boundary location of the two neighboring rows is determined to generate a boundary error candidate, $\delta_{i,j}$. Since multiple boundaries can be found within each row, all the error candidates for the row are recorded and tested to determine the consistency among the error candidates within each row. Particularly, the average error candidate, $\bar{\delta}_j$ and the average of the quantity $|\bar{\delta}_j - \delta_{i,j}|$ for all the error candidates for row j is determined to produce $\omega_j$. If $\omega_j$ is less than a pre-defined threshold, the shift in object boundaries for row j is likely caused by motion, and a simple linear shift of the row by an amount $\bar{\delta}_j$ is performed. Otherwise, each boundary that has significant shift is smoothed along the boundary direction with the neighboring rows.

The above described algorithm is believed to be effective in correcting images for stair case type artifacts in dental scans. Particularly, such algorithm enables reducing the motion effect within each tomographic slice without increasing the discontinuity between slices.

DETAILED DESCRIPTION

Figure 1:
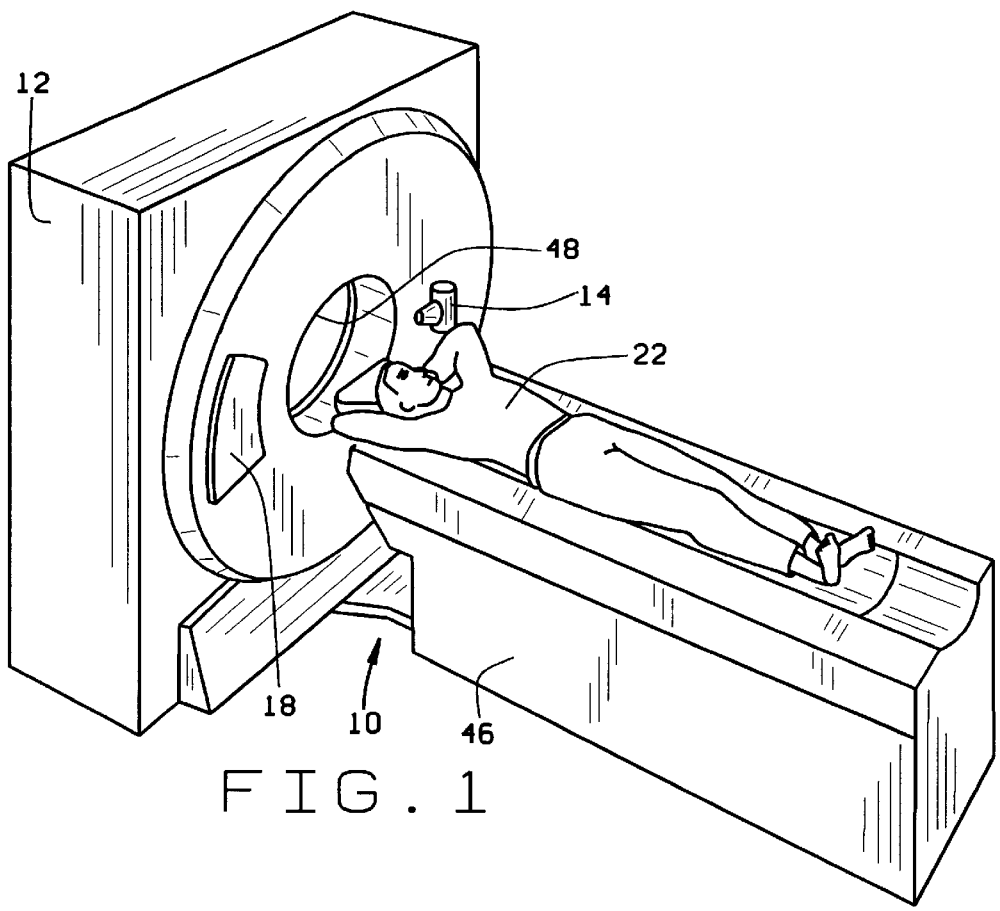
FIG. 1 is a pictorial view of a CT imaging system.
Figure 2:
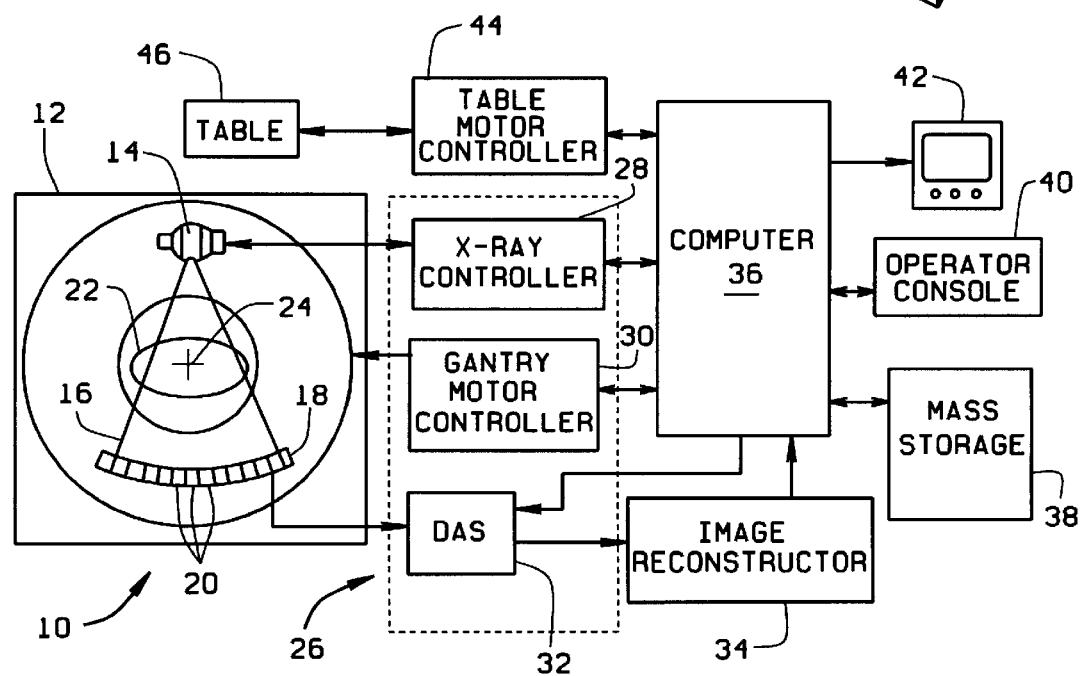
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

The correction algorithm described below may be implemented in computer 36 and practiced using the image generated by image reconstructor 34. It will be apparent to those skilled in the art, of course, that such algorithm could be practiced in other components. In addition, the correction algorithm is described below as being performed in the reformatted image space for computational simplicity. Of course, such correction could be performed on the original reconstructed images. In addition, the term "high density" objects refers to objects having significantly different densities as compared to soft tissue.

As described above, and with reformatted dental scans, most stair-case artifacts appear near the edge of high density objects, e.g., bones and teeth. If the artifact is caused by simple motion, e.g., patient or table motion, the motion artifact can be easily removed from the image by simple geometric transformation. Particularly, since the bony structure is rigid, the motion will likely appear as a simple one dimensional translation of the slice.

If the artifact is caused by other factors, e.g., as a result of the interpolation algorithm or calibration errors, the misalignment of the boundaries probably will not be consistent for all structures. That is, there will be inconsistency among boundary shifts within each slice. When an inconsistency among boundary shifts within each slice is present, no geometric transformations are performed on the image slice. Rather, the edges along the object boundaries are smoothed or no operation is performed on the boundaries.

In accordance with one embodiment of the correction algorithm, and to eliminate the "stair case" artifact, all high density object boundaries in the reformatted images are identified. Significant density variations can exist, however, even among dense objects. For example, the CT number for teeth is much higher than the CT number for bones. As a result, a simple threshold method is not sufficient for identifying object boundaries.

Therefore, to identify high density object boundaries, structures in the reformatted image are separated into two classes, namely, structure containing teeth and structure not containing teeth. To perform such classification, and for each row in the reformatted image (and therefore, each slice in the reconstructed image), the maximum intensity is identified. If the maximum intensity exceeds a predefined threshold, the row is classified as the "teeth" class. Otherwise, the row is classified as not containing teeth, i.e., formed with bones only.

Then, within each class, fuzzy logic is used to define the membership grade of each pixel. The relationship between the membership grade and its pixel intensity are defined as:

$$\xi(p) = \begin{cases} 0 & \text{if } p < p_{lo} \\ 3p'2 - 2p'3 & \text{if } p_{lo} \leq p < p_{hi} \\ 1 & \text{if } p \geq p_{hi} \end{cases} \quad (1)$$

where $$p' = \frac{p - P_{lo}}{P_{hi} - P_{lo}}$$

where $P_{hi}$ and $P_{lo}$ are empirically determined parameters for each class. The "rough" boundaries are defined as the location where the membership value is closest to 0.5. The true boundary, $\gamma_{i,j}$, is defined as the location where the membership value equals 0.5. The indexes i,j indicate the $i^{th}$ boundary identified for the $j^{th}$ row in the reformatted image. Linear interpolation is performed for the true boundary determination. The true boundary $\gamma_{i,j}$, in general, is not an integer.

To reduce the probability that spike noise will be erroneously considered as high density objects, the N by N neighbors of the boundary candidate are searched to ensure that the number of pixels that belong to the high density object exceeds a certain predefined threshold. Such searching can be performed by summing the N by N neighbors of the membership function, $\xi$, and comparing the summation against a pre-defined threshold.

Figure 3:
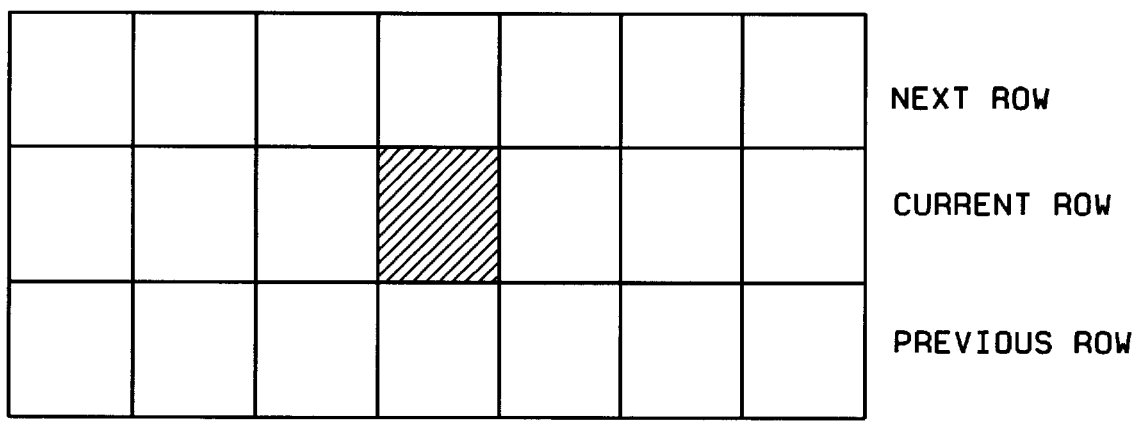
FIG. 3 illustrates the boundary search for neighboring rows.
Figure 3:
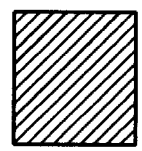
Figure 3:
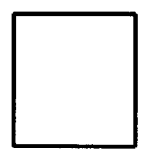

A boundary search for the slices that are immediately above and below the current slice is then performed. The search is centered around the boundary candidate to the left and right of M pixels. An exemplary search is shown in FIG. 3, and this search, M=3. Limiting the boundary search for the neighboring rows to the nearby pixels avoids the situation where the boundaries of other high density objects are included in the current boundary. Since the scan is taken with thin slice thickness and the high density objects are, in general, continuous, this search strategy is believed to be reliable.

Once the boundaries of the neighboring rows are located, the difference between the true boundary of the current row and the average boundary location of the two neighboring rows is determined to generate a boundary error candidate, $\delta_{ij}$. Specifically:

$$\delta_{i,j} = \frac{\gamma_{i,j-1} + \gamma_{i,j+1}}{2} - \gamma_{i,j} \quad (2)$$

Since multiple boundaries can be found within each row, all the error candidates for the row are recorded and no correction is made until further testing is performed.

Specifically, the following test determines the consistency among the error candidates within each row. The average error candidate, $\overline{\delta}_j$ and the average of the quantity $|\overline{\delta}_j - \delta_{i,j}|$ for all the error candidates for row j is determined to produce $\omega_j$. If $\omega_j$ is less than a pre-defined threshold, the shift in object boundaries for row j is likely caused by motion, and a simple linear shift of the row by an amount $\overline{\delta}_j$ is performed.

Otherwise, each boundary that has significant shift is smoothed along the boundary direction with the neighboring rows.

The above described algorithm is believed to be effective in correcting images for stair case type artifacts in dental scans. Particularly, such algorithm enables reducing the motion effect within each tomographic slice without increasing the discontinuity between slices. Further, the algorithm is not limited to use in only dental scans but can be used to remove stair-case artifacts in bone or air pocket images. Generally, images of object pairs which have a significant density difference can be corrected using the above described algorithm. For example, images for object pairs such as soft tissue/air and soft tissue/bone have significantly different densities and can be corrected using the above described algorithm.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A method for suppressing stair case type artifacts in data collected by a computed tomography system, said method comprising the steps of:

identifying boundaries between objects having significant density differences; and defining a membership grade for each pixel.

2. A method in accordance with claim 1 wherein identifying object boundaries in the image comprises the step of separating structures in the image into at least two classes, a first class being structure having a first density and a second class being structure having a second density.

3. A method in accordance with claim 2 wherein separating structures in the image into at least two classes comprises the step of identifying a maximum intensity for each pixel row in the image.

4. A method in accordance with claim 3 wherein if a pixel maximum intensity in a row exceeds a predefined threshold, the row is classified as the class wherein the structure has the first density.

5. A method in accordance with claim 1 wherein defining a membership grade of each pixel comprises the step of searching N by N neighbors of a boundary candidate to ensure that each pixel that belongs to a first density object exceeds a certain predefined threshold.

6. A method in accordance with claim 5 wherein searching N by N neighbors comprises the steps of summing the N by N neighbors of the membership function, $\xi$, and comparing the summation against a pre-defined threshold.

7. A method in accordance with claim 1 further comprising the step of generating a boundary error candidate, $\delta_{i,j}$.

8. A method in accordance with claim 7 wherein generating a boundary error candidate comprises the steps of recording error candidates for each row and testing each candidate to determine the consistency among the error candidates within each row.

9. A method in accordance with claim 7 wherein generating a boundary error candidate comprises the steps of determining an average error candidate, $\overline{\delta_j}$ and an average of a quantity $|\overline{\delta_{i,j}} - \delta_{i,j}|$ for all error candidates for row j to generate $\omega_j$, and wherein if $\omega_j$ is less than a pre-defined threshold, performing a linear shift of the row j by an amount $\overline{\delta_{i,j}}$.

10. A method in accordance with claim 9 wherein if $\omega_j$ is greater than a pre-defined threshold, smoothing each boundary that has significant shift along a boundary direction with neighboring rows.

11. A computed tomography system comprising a detector, an x-ray source for projecting an x-ray beam towards said detector, and a computer coupled to said detector for processing data collected by said detector, said computer comprising a processor programmed to:

identify boundaries between objects having significant density differences; and define a membership grade for each pixel.

12. A computed tomography system in accordance with claim 11 wherein to identify boundaries between objects having significant density differences, said processor is programmed to separate structures in the image into at least two classes, a first class being structure having a first density and a second class being structure having a second density.

13. A computed tomography system in accordance with claim 12 wherein to separate structures in the image into at least two classes, said processor is programmed to identify a maximum intensity for each pixel row in the image.

14. A computed tomography system in accordance with claim 13 wherein if a pixel maximum intensity in a row exceeds a predefined threshold, said processor is programmed to classify the row in the class wherein the structure has the first density.

15. A computed tomography system in accordance with claim 11 wherein to define a membership grade of each pixel, said processor is programmed to search N by N neighbors of a boundary candidate to ensure that each pixel that belongs to a first density object exceeds a certain predefined threshold.

16. A computed tomography system in accordance with claim 15 wherein to search N by N neighbors, said processor is programmed to sum the N by N neighbors of the membership function, $\xi$, and compare the summation against a pre-defined threshold.

17. A computed tomography system in accordance with claim 11 wherein said processor is further programmed to generate a boundary error candidate, $\delta_{i,j}$.

18. A computed tomography system in accordance with claim 17 wherein to generate a boundary error candidate, said processor is programmed to record error candidates for each row and test each candidate to determine the consistency among the error candidates within each row.

19. A computed tomography system in accordance with claim 17 wherein to generate a boundary error candidate, said processor is programmed to determine an average error candidate, $\overline{\delta_j}$ and an average of a quantity $|\overline{\delta_{i,j}} - \delta_{i,j}|$ for all error candidates for row j to generate $\omega_j$, and wherein if $\omega_j$ is less than a pre-defined threshold, perform a linear shift of the row j by an amount $\overline{\delta_j}$.

20. A computed tomography system in accordance with claim 19 wherein said processor is programmed to smooth each boundary that has significant shift along a boundary direction with neighboring rows if $\omega_j$ is greater than a pre-defined threshold.

* * * * *